United States Patent
Salcedo

(10) Patent No.: US 9,571,452 B2
(45) Date of Patent: Feb. 14, 2017

(54) DEPLOYING A SECURITY POLICY BASED ON DOMAIN NAMES

(71) Applicant: Sophos Limited, Abingdon, Oxfordshire (GB)

(72) Inventor: Jonathan Egan Salcedo, San Francisco, CA (US)

(73) Assignee: Sophos Limited, Abingdon (GB)

( * ) Notice: Subject to any disclaimer, the term of this patent is extended or adjusted under 35 U.S.C. 154(b) by 123 days.

(21) Appl. No.: 14/753,339

(22) Filed: Jun. 29, 2015

(65) Prior Publication Data
US 2016/0006693 A1  Jan. 7, 2016

Related U.S. Application Data

(60) Provisional application No. 62/019,541, filed on Jul. 1, 2014.

(51) Int. Cl.
*H04L 29/06* (2006.01)
*H04L 29/12* (2006.01)

(52) U.S. Cl.
CPC ........ *H04L 63/0236* (2013.01); *H04L 61/1511* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 6,757,740 B1* | 6/2004 | Parekh | ............... | G06F 17/30241 707/E17.11 |
| 9,021,085 B1* | 4/2015 | Jensen | ................... | H04L 51/12 709/219 |
| 2003/0200335 A1* | 10/2003 | Choi | ................... | H04L 61/1511 709/245 |
| 2005/0022031 A1* | 1/2005 | Goodman | ............ | G06Q 10/107 726/4 |
| 2005/0289084 A1* | 12/2005 | Thayer | ............... | G06Q 20/3674 705/67 |
| 2006/0031385 A1* | 2/2006 | Westerdal | ......... | H04L 29/12066 709/217 |
| 2006/0129503 A1* | 6/2006 | Roberts, III | ......... | G06Q 20/401 705/75 |
| 2006/0212931 A1* | 9/2006 | Shull | ....................... | G06F 21/55 726/10 |

(Continued)

*Primary Examiner* — Peter Poltorak
(74) *Attorney, Agent, or Firm* — Strategic Patents, P.C.

(57) ABSTRACT

A firewall uses a variety of techniques to obtain a useful domain name from a network request, that is, a domain name that facilitates the accurate enforcement of domain-based security rules for network traffic at the firewall. If the network request includes an Internet Protocol (IP) address instead of the domain name, the firewall may begin with a reverse domain name lookup. If this technique fails to adequately resolve the domain name, then the firewall may attempt a hypertext transfer protocol (HTTP) GET request to the IP address and investigate the header for useful domain name information. The firewall may also or instead initiate a secure connection to the IP address and analyze a certificate returned from the destination for the presence of domain name information. These measures can produce one or more domain names that can be collectively analyzed to select a suitable domain name for the application of a domain-based security rule or policy by the firewall.

21 Claims, 4 Drawing Sheets

(56) References Cited

U.S. PATENT DOCUMENTS

| | | | | |
|---|---|---|---|---|
| 2007/0250916 | A1* | 10/2007 | Shull | H04L 63/08 |
| | | | | 726/5 |
| 2007/0250919 | A1* | 10/2007 | Shull | G06F 21/31 |
| | | | | 726/7 |
| 2008/0034211 | A1* | 2/2008 | Shull | H04L 29/12066 |
| | | | | 713/175 |
| 2008/0177843 | A1* | 7/2008 | Gillum | G06Q 10/107 |
| | | | | 709/206 |
| 2008/0201401 | A1* | 8/2008 | Pugh | H04L 63/1441 |
| | | | | 709/201 |
| 2009/0031033 | A1* | 1/2009 | Deng | H04L 63/1483 |
| | | | | 709/229 |
| 2009/0164597 | A1* | 6/2009 | Shuster | H04L 29/12066 |
| | | | | 709/206 |
| 2015/0295938 | A1* | 10/2015 | Guo | H04L 63/0236 |
| | | | | 726/30 |

* cited by examiner

DEPLOYING A SECURITY POLICY BASED ON DOMAIN NAMES

CROSS-REFERENCE TO RELATED APPLICATIONS

This application claims the benefit of U.S. Provisional Patent Application No. 62/019,541, filed Jul. 1, 2014, the entire content of which is hereby incorporated by reference.

TECHNICAL FIELD

This application relates to deploying a security policy based on domain names, and more specifically to improved techniques for determining the domain name corresponding to an IP address in a network request.

BACKGROUND

Firewalls apply rules to block access by a client device to various network resources. In some instances, the firewall can obtain a domain name associated with a network request because the request either contains the domain name, or the request contains an Internet Protocol (IP) address that can be easily and accurately resolved into a domain name. However, when the request contains an IP address that does not readily resolve to a useful domain name, it can be difficult to apply security rules at the firewall that are domain-name based.

There remains a need for improved determination of a domain name based on an IP address for use in network security.

SUMMARY

A firewall uses a variety of techniques to obtain a useful domain name from a network request, that is, a domain name that facilitates the accurate enforcement of domain-based security rules for network traffic at the firewall. If the network request includes an Internet Protocol (IP) address instead of the domain name, the firewall may begin with a reverse domain name lookup. If this technique fails to adequately resolve the domain name, then the firewall may attempt a hypertext transfer protocol (HTTP) GET request to the IP address and investigate the header for useful domain name information. The firewall may also or instead initiate a secure connection to the IP address and analyze a certificate returned from the destination for the presence of domain name information. These measures can produce one or more domain names that can be collectively analyzed to select a suitable domain name for the application of a domain-based security rule or policy by the firewall.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
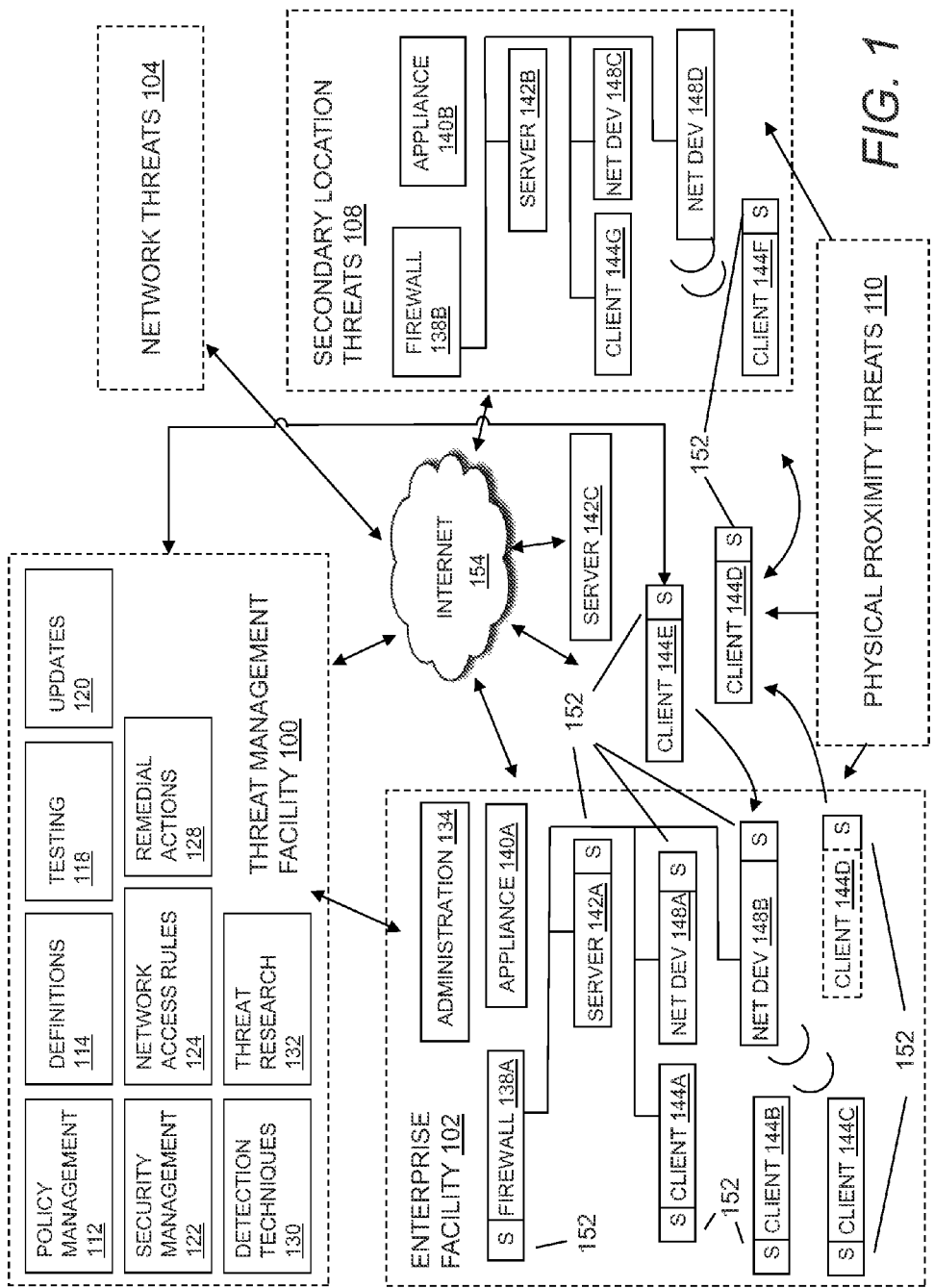
FIG. 1 illustrates an environment for threat management.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

While techniques described herein may emphasize certain network security techniques using firewalls and the like, it will be appreciated that the disclosed systems and methods may be more generally applicable in a wide variety of contexts, including contexts related to security and contexts outside of the realm of network security. In general, the techniques disclosed herein may be usefully employed in any context where a need arises for determining domain names from an Internet Protocol (IP) address. As such, the scope of this disclosure is not limited by the context and examples provided herein, but is intended to include any other adaptations or uses of the disclosed techniques that might be apparent to one of ordinary skill in the art.

An environment for threat management where the devices, systems, and methods discussed herein may be utilized will now be described.

FIG. 1 illustrates an environment for threat management. Specifically, FIG. 1 depicts a block diagram of a threat management system providing protection to an enterprise against a plurality of threats. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both a technical perspective and a user perspective, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility 100 may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach endpoint computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities, or the like.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict IM activity to only support personnel for communicating with customers. This may allow communication for departments requiring access, but may maintain the network bandwidth for other activities by restricting the use of IM to only the personnel that need access to instant messaging (IM) in support of the enterprise facility 102. In an embodiment, the policy management facility 112 may be a stand-alone application, may be part of the network server facility 142, may be part of the enterprise facility 102 network, may be part of the client facility, or the like.

In embodiments, the threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services are provided indirectly through a third-party product, the application may be suspended until action is taken to remove or disable the third-party product's protection facility.

Threat management against a sometimes quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility, the enterprise facility 102 network and/or client facility may pull information from the security facility 122 and policy management facility 112 network server facilities 142, there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

In an embodiment, a definition management facility 114 may provide for the timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility application should be granted access to a requested network location. The network location may be on the same network as the facility or may be on another network. In an embodiment, the network access control may verify access rights for client facilities from within the network or may verify access rights of computer facilities from external networks. When network access for a client facility is denied, the network access control may send an information file to the client facility, the information file may contain data or commands that may provide instructions for the remedial action facility 128. The information sent by the network access facility 124 control may be a data file. The data file may contain a number of commands, definitions, instructions, or the like to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or endpoint devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the endpoint computer security facility 152, located on a computer's desktop, which may provide threat protection to a user, and associated enterprise facility 102. In embodiments, the term endpoint may refer to a computer system that may source data, receive data, evaluate data, buffer data, or the like (such as a user's desktop computer as an endpoint computer), a firewall as a data evaluation endpoint computer system, a laptop as a mobile endpoint computer, a PDA or tablet as a hand-held endpoint computer, a mobile phone as an endpoint computer, or the like. In embodiments, endpoint may refer to a source or destination for data, including such components where the destination is characterized by an evaluation point for data, and where the data may be sent to a subsequent destination after evaluation. The endpoint computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the endpoint computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the endpoint computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURI, Delphi, Droplets, Java, win32, X11, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated endpoint computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an endpoint computer security facility 152. These appliances may provide interconnection services within the enterprise facility 102 network, and therefore may advance the spread of a threat if not properly protected.

One way for a client facility to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network." Since firewall facilities 138 represent boundaries between threat levels, the endpoint computer security facility 152 associated with the firewall facility 138 may provide resources that may control the flow of threats at this enterprise facility 102 network entry point. Firewall facilities 138, and associated endpoint computer security facility 152, may also be associated with a network node that may be equipped for interfacing between networks that use different protocols. In embodiments, the endpoint computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop endpoint computer security facility 152.

The interface between the threat management facility 100 and the enterprise facility 102, and through the appliance facility 140 to embedded endpoint computer security facilities, may include a set of tools that may be the same for all enterprise implementations, but allow each enterprise to implement different controls. In embodiments, these controls may include both automatic actions and managed actions. Automatic actions may include downloads of the endpoint computer security facility 152 to components of the enterprise facility 102, downloads of updates to existing endpoint computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same endpoint computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144B-F), if not for the presence of the endpoint computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144D-F) that has an embedded endpoint computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded endpoint computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the endpoint computer security facility 152 equipped components of the enterprise facility 102. In turn the endpoint computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, websites, e-mail, IM, VoIP, application software, and the like. These threats may attempt to attack a mobile enterprise client facility (e.g., the clients 144B-F) equipped with an endpoint computer security facility 152, but in embodiments, as long as the mobile client facility is embedded with an endpoint computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 endpoint computer security facility 152 may manage actions in unprotected network environments such as when the client facility (e.g., client 144F) is in a secondary location 108 or connecting wirelessly to a non-enterprise facility 102 wireless Internet connection, where the endpoint computer security facility 152 may dictate what actions are allowed, blocked, modified, or the like. For instance, if the client facility's 144 endpoint computer security facility 152 is unable to establish a secured connection to the threat management facility 100, the endpoint computer security facility 152 may inform the user of such, and recommend that the connection not be made. In the instance when the user chooses to connect despite the recommendation, the endpoint computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the endpoint computer security facility 152 may perform specific actions to remediate possible threat incursions or policy violations during or after the unprotected connection.

The secondary location 108 may have no endpoint computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the endpoint computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

In general, the devices, systems, and methods discussed herein may implement a variety of threat management techniques such as those described in U.S. Provisional Patent Application No. 62/019,541, which is hereby incorporated by reference in its entirety.

Having provided an overall context for threat detection, the description now turns to devices, systems, and methods for deploying a security policy based on domain names, and more particularly to devices, systems, and methods to determining a domain name based on an Internet Protocol (IP) address for use in network security or otherwise. This may be useful, for example, for administrators wishing to block user access to certain domains. Although in most cases, a network security system will already know whether a user is attempting access to a blocked domain (i.e., because the network security system will typically intercept a domain name system (DNS) request that includes the domain name), there exist circumstances where the domain name is not present, and instead an IP address is present in the network request. In such instances, a network security system may attempt to determine the domain name associated with the IP address in order to implement the security policy.

Figure 2:
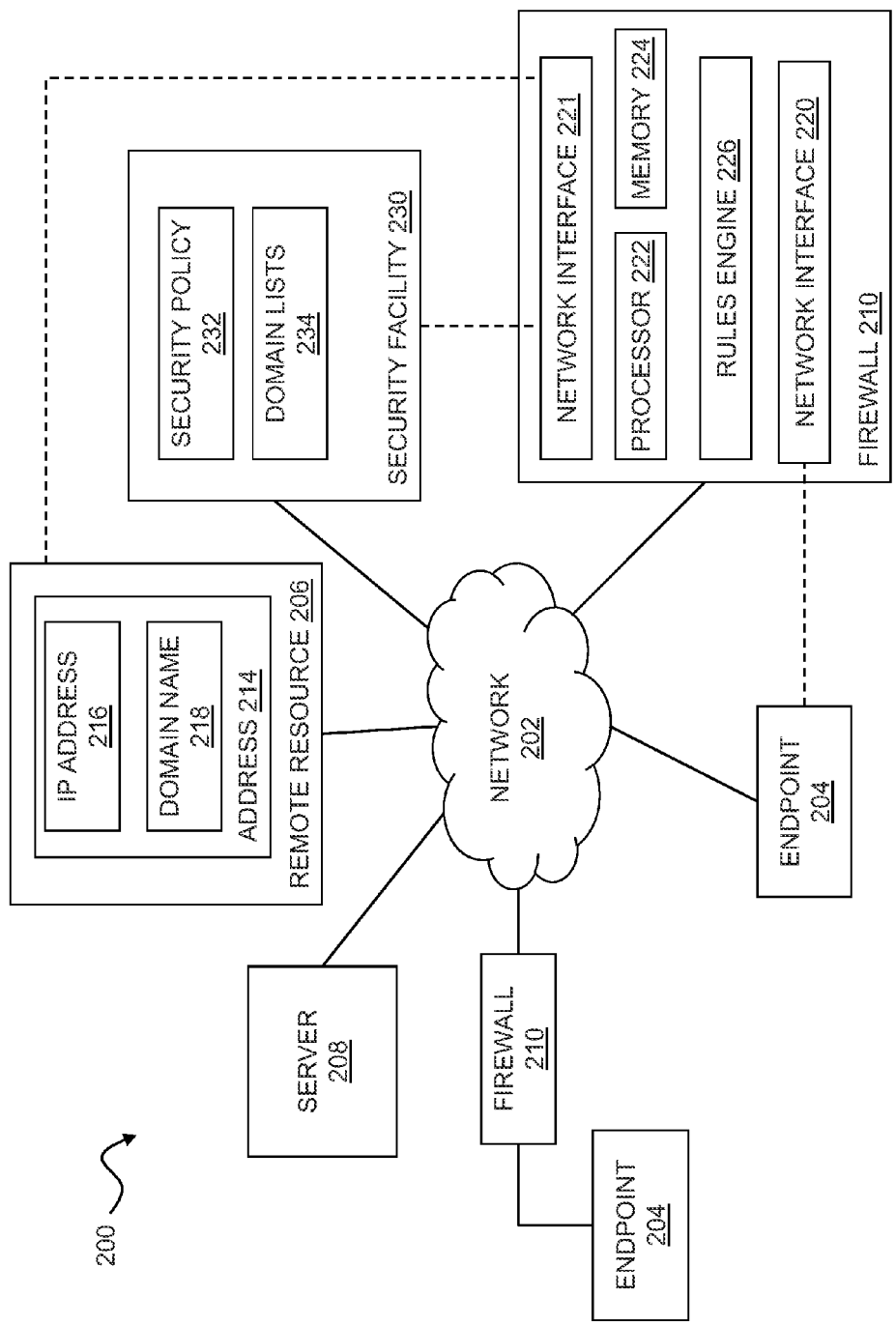
FIG. 2 illustrates a system for deploying a security policy based on domain names.

FIG. 2 illustrates a system for deploying a security policy based on domain names. As shown in the figure, the system 200 may include a network 202 interconnecting a plurality of participants (e.g., devices, systems, components, facilities, and so on) in a communicating relationship. The participants may, for example, include any number of endpoints 204, a remote resource 206, a server 208, a firewall 210, and a security facility 212. Any of the participants shown in the system 200 may be the same as or similar to the entities discussed above with reference to FIG. 1

The network 202 may include any data network(s) or internetwork(s) suitable for communicating data and control information among participants in the system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the system 200. The network 202 may also include a combination of data networks, and need not be limited to a strictly public or private network.

The endpoints 204 may be any as discussed herein with reference to FIG. 1, and may for example include client devices such as a computer or computer system, a laptop, a Personal Digital Assistant, a mobile phone, a smart phone, a tablet, or any other mobile or fixed computing device. Other network elements such as a firewall 210 or server 208 may be endpoints in certain contexts, such as where a firewall acts as a data evaluation endpoint computer system or a server hosts one or more virtual machines. In general, the endpoint 204 may be protected by one or more firewalls 210 that monitor and conditionally forward traffic between the endpoint 204 and other resources connected to the network 202, using, e.g., firewall rules or other security policies or the like.

The remote resource 206 may include a web server, processing resource, program, computer file, database, file server, e-mail server, media server, or other server, or any other computing resource or the like accessible through the network 202, as well as combinations of the foregoing. In general, a security policy for an enterprise may contain rules permitting, restricting, or prohibiting access to a particular remote resource 206, which rules may be enforced, for example, at the firewall 210.

The remote resource 206 may have a specific address 214, such as an Internet Protocol (IP) address that uniquely identifies the remote resource 206 on the network 202 so that other entities on the network 202 such as the endpoints 204 can locate the remote resource 206 to form a connection. The Domain Name System (DNS) generally provides a hierarchical, distributed naming system for computers, services or resources connected to the network 202, and DNS name servers can translate between IP addresses and the more human-readable DNS names. The techniques contemplated herein apply rules or policies based on the human-readable domain name. In order to determine the domain name from other information, such as an IP address in a network request, additional steps are required. One technique for recovering the domain name is a reverse DNS lookup from a name server. Unfortunately, these databases are typically compiled from historical IP navigation without any quality control or other corrective mechanisms, and they are generally not intended to support one-to-one mapping of an IP address to a domain name in a manner that permits unambiguous resolution of the domain name 218 using the IP address 216. For example, at the time of this writing, doing a standard domain name lookup on "www.google.com" results in the following IP list: 74.125.239.112, 74.125.239.113, 74.125.239.114, 74.125.239.116, 74.125.239.115. However, doing a reverse domain name lookup on one of these IP addresses—74.125.239.112—results in the domain name "nuq05s01-in-f16.1e100.net". From these results, it is evident that the mappings provided by using DNS lookups are not necessarily symmetric—i.e., www.google.com maps to 74.125.239.112, while 74.125.239.112 maps to nuq05s01-in-f16.1e100.net. Thus, additional techniques for determining a domain name associated with an IP address are desirable, and the processor 222 may be configured to implement these techniques using the processes outlined below.

As another difficulty, multiple domains or services may be hosted at a single IP address. For example, a security policy may permit access to a search engine service such as that provided at the website of Google for research and information purposes, while prohibiting access to a video sharing service such as that provided at the website of YouTube. Because these services are owned by a single company, both of the aforementioned websites may be served by the same host and/or IP address, thus creating a "one-to-many" situation, i.e., where one IP address maps to many domain names using traditional reverse domain name lookup methods. The techniques contemplated herein may be usefully applied to disambiguate such network requests.

The system 200 may include one or more other servers 208, which may host other resources such as a domain name service, a reverse domain name lookup service, a policy management service, an enterprise threat management facility, or any other service or the like contemplated herein.

In general, the firewall 210 operates between an endpoint 204 and the network 202 to control or limit traffic therebetween based on one or more rules or policies as specified by the rules engine 226. The firewall 210 may be a personal firewall installed on the endpoint 204, or on a gateway or other device physically positioned between the endpoint 204 and the network 202. In another aspect, the firewall 210 may operate as a network resource or cloud-based firewall, with traffic to and from the endpoint 204 directed through the remote firewall 210 in order to enforce appropriate firewall rules independent of the network location of the endpoint 204.

The firewall 210 may include one or more network interfaces 220, 221, e.g., a first network interface 220 coupled to an endpoint 204 and a second network interface 221 coupled to a remote resource 206 that is coupled to (or attempting to couple to) the endpoint 204 in a communicating relationship. The firewall 210 may also couple through one of the network interfaces 220, 221 to a security facility 212 or the like in order to update a rules engine 226 that is used to support various firewall rules. It will be appreciated that the network interfaces 220, 221 may be a shared interface, such as where the firewall is a cloud-based firewall and the network interfaces 220, 221 are direct interfaces to the network 202. In another aspect where the firewall 210 is physically disposed between an endpoint 204 and the network, the first interface 220 may be, for example a local area network interface or the like suitable for forming a local wireless or wired connection to the endpoint 204, and the second interface 221 may be a high speed interface or the like configured to couple to the data network 202 through a network service provider or the like.

The firewall 210 may include a processor 222 and memory 224 in order to control operation of the firewall 210. The memory 224 may store computer code for executing the rules engine 226, and the memory 224 may also store data such as domain lists 224 or other domain name or routing information and the like. The processor 228 may be configured to respond to a network request of one or more of the endpoints 204 by resolving the network request into a domain and applying a domain-based firewall rule or security policy as described in greater detail below.

The security facility 230 may store a security policy 232 that allows or prevents access to certain types of remote resources 206 by endpoints 204 or users of the endpoints 204 (e.g., particular employees, groups of employees, types of employees, guest of a company, administrators, and so on). For example, a company may elect to prevent certain endpoints 204 or users from accessing certain websites or domains, while allowing access to others. These domains may be included in domain lists 234 stored in the security facility 212 that provide, for example, whitelists or blacklists of known domains. The security policy 232 may include more complex rules, such as rules that vary according to the scheme (e.g., http, ftp, file, etc.), port number, path, query string, protocol (e.g., http v. https), resource type (e.g., file, media, executables, etc.) and other attributes of a network request. In addition, the security policy 232 may use additional contextual information such as the frequency and type of requests to a domain, reputation of a domain, time of day, resource location, user privileges, application types requesting the network access, and so forth, in order to provide flexible rules for permitting or denying network requests. Any such rules may be implemented as rules and/or a security policy 232 as contemplated herein. The security facility 230 may, for example, be a threat management facility or other enterprise network security resource such as any of those described above with reference to FIG. 1.

There are certain instances where the address 214 for a network request to access the remote resource 206 does not include a domain name 218, but instead includes an IP address 216. As described above, in these instances, when the address 214 includes an IP address 216 instead of a domain name 218, the processor 228 of the firewall 210 may attempt a reverse domain name lookup (i.e., reverse DNS lookup) and extract a domain name 218 associated with the IP address 216 from the reverse domain name lookup, or may attempt to query the remote resource 206 directly for domain name information using the IP address 216. In one aspect, when the address 214 includes an IP address 216, the processor 228 of the firewall 210 transmits a hypertext transfer protocol (HTTP) GET request from the firewall 210 to the IP address 216. A response from such a HTTP GET request may include a header, where the domain name 218 associated with the IP address 216 can be extracted from the header. The processor 228 of the firewall 210 may also or instead initiate a secure connection from the firewall 210 to the IP address 216. In response, the processor 228 may receive a certificate at the firewall 210 from the server 208 hosting the remote resource 206. The certificate may then be analyzed for name information, where the domain name 218 associated with the IP address 216 can be extracted from the name information.

Once one or more domain names 218 are extracted by the processor 228 of the firewall 210, the processor 228 can analyze the domain names 218 to select one or more true domain names that best represent the domain for purposes of applying a security, and may accordingly apply the security policy 222 to the network request of the endpoint 204 based on the resolved domain name 218.

Figure 3:
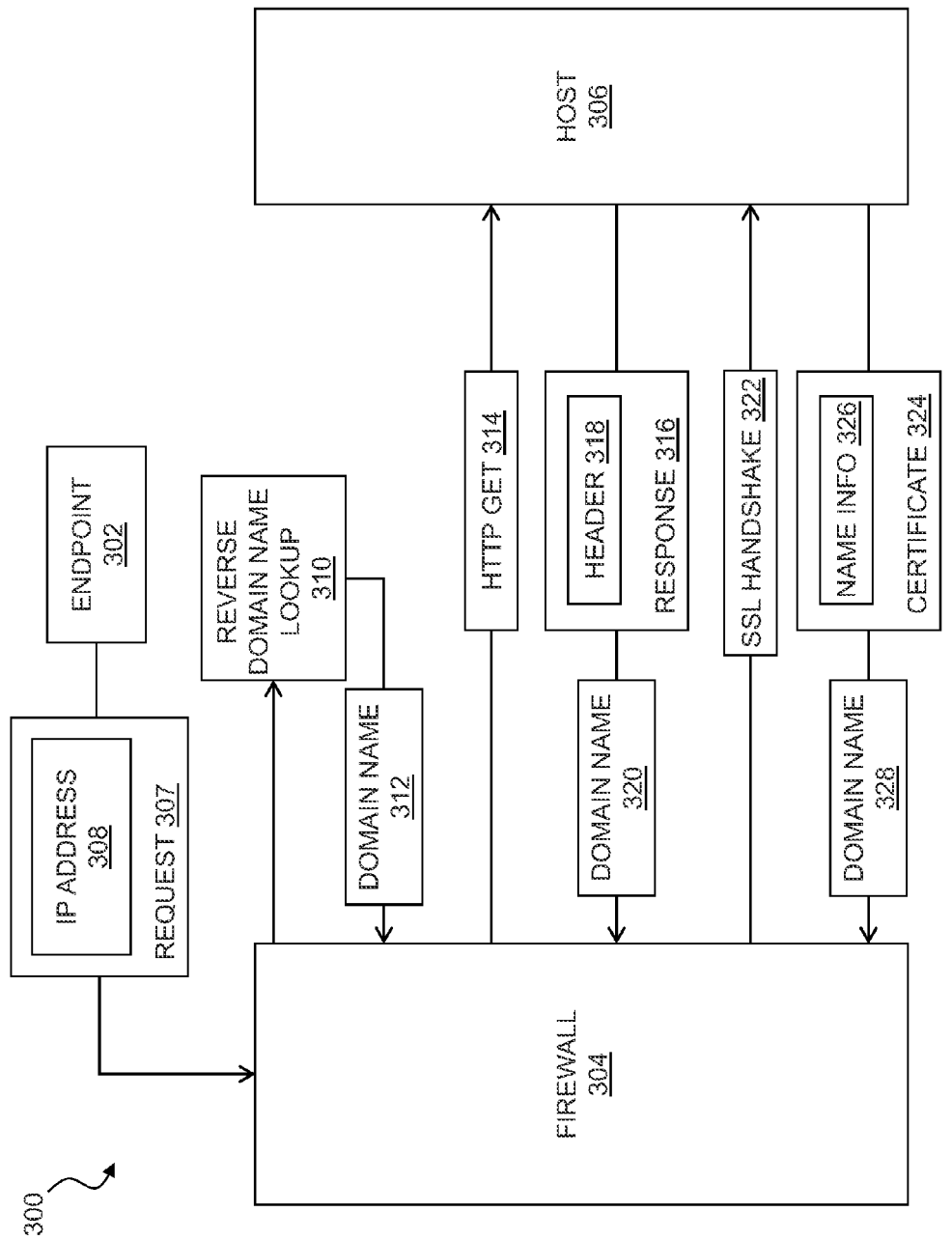
FIG. 3 illustrates a system for determining a domain name from an Internet Protocol (IP) address.

FIG. 3 illustrates a system for determining a domain name from an Internet Protocol (IP) address. The system 300 may include an endpoint 302, a firewall 304, and a host 306. The endpoint 302 may be any as described herein, e.g., a client device attempting to access a remote resource (e.g., a website) that is operated by the host 306.

The firewall 304 may include a security facility, threat management facility, enterprise facility, gateway, router, switch or dedicated firewall, or the like that provides a firewall or similar functionality for network traffic between the endpoint 302 and the host 306 (or more generally, a network). In general, the firewall 304 may be implemented in hardware, software, or some combination of these. The firewall 304 may be physically interposed between the endpoint 302 and the host 306, or the firewall 304 may be a cloud-based firewall through which all endpoint 302 network traffic is purposefully routed by an enterprise security management facility or the like.

The firewall 304 may enforce a security policy for an enterprise, and the security policy may, among other things, control access to various network resources according to domain name. If only an IP address is provided in a request 307, the firewall 304 can apply a variety of techniques to identify a corresponding domain name in order to allow, block or otherwise handle the request 307 according to the security policy.

As illustrated, the endpoint 302 may initiate the request 307 for access to a remote resource operated by the host 306, where the request 307 includes an IP address 308. The firewall 304 may receive this request 307 as part of its observation and monitoring of traffic to and from the endpoint 302. In response, the firewall 304 may perform a reverse domain name lookup 310 using the IP address 308. The results of the reverse domain name lookup 310 may include at least a first domain name 312. Alternatively, the results of the reverse domain name lookup 310 may fail to determine at least a first domain name 312.

Upon receiving the request 307 from the endpoint 302, the firewall 304 may also or instead attempt a HTTP GET request 314 to the IP address 308. In one aspect, the HTTP GET request 314 is initiated over a connection on one or more well-known ports used for HTTP (e.g., port 80 and port 8080). According to the HTTP protocol, the response 316 to the HTTP GET request 314 may include a header 318 with an HTTP status code specifying a redirection. For example, an HTTP status code of '301' identifies a temporary redirection address for reaching a requested website, and an HTTP status code of '302' identifies a permanent redirection address. The redirection may also include a Location header from which a domain name can be extracted (e.g., at least a second domain name 320 is extracted from the header 318). Additionally, if the response 316 to the HTTP GET request 314 is not a '301' or '302' response, the response 316 may still include a Set-Cookie header or the like that specifies a domain for which the cookie is applicable. If such information is present, it can also or instead be used as a possible domain name (e.g., the second domain name 320 may be extracted from the Set-Cookie header).

As shown in the figure, upon receiving the request 307 from the endpoint 302, the firewall 304 may also or instead attempt a secure connection to the IP address 308 with a Secure Sockets Layer (SSL) connection or the like, shown as an SSL handshake 322 in FIG. 3. A Transport Layer Security/Secure Socket Layer (TLS/SSL) connection may also or instead be used. The SSL handshake 322 may be attempted using well-known ports for HTTPS (e.g., port 443 and port 8443). In response to the secure connection attempt, the host 306 may present a certificate 324 that includes name information 326 from which a domain name can be extracted, such as a third domain name 328. The name information 326 may include, e.g., a Common Name or Subject Alternative Names provided for purposes of checking or verifying certificates provided from the host 306. These domain names may be used as possible domain names associated with the IP address 308 for the purposes of domain name resolution as contemplated herein.

It will be apparent that the order in which the mechanisms discussed above (i.e., the reverse domain name lookup 310, the HTTP GET request 314, and the SSL handshake 322) are performed may be interchangeable and is not limited to the examples provided herein. Additionally, some of these steps may only be optionally performed when a domain has not yet been resolved. For example, in an aspect, if one mechanism fails to resolve to a unique domain, then and only then will another mechanism be performed (e.g., in an aspect, only when the response 316 to the HTTP GET request 314 fails to resolve to a unique domain to be used as the second domain name 320 will the SSL handshake 322 be attempted by the firewall 304).

In another aspect, all of the techniques may be applied to every network request from the endpoint 302 that contains an IP address. This latter approach advantageously provides several data points to most accurately and confidently resolve the appropriate domain name for an IP address: (1) a domain name appearing in a reverse domain name lookup, (2) a domain name specified in an HTTP response from the IP address, and (3) a domain name specified in a certificate from the IP address in response to the initiation of a secure connection. If two or more of these sources of data resolve to a specific domain name, then this domain name may be confidently used as the correct domain name for the IP request and a suitable security policy may be applied. Other contextual information may also or instead be used, such as the type of content or resource requested in the network request, a history of network traffic to and from the endpoint 302 or any other useful data.

The result of applying the mechanisms discussed above (i.e., the reverse domain name lookup 310, the HTTP GET request 314, and the SSL handshake 322) in the system 300 may include obtaining a plurality of domain names that are potentially associated with the IP address 308, or obtaining a specific domain name that is associated with the IP address 308. The obtained domain names may be stored in a memory for future use by the firewall 304.

Figure 4:
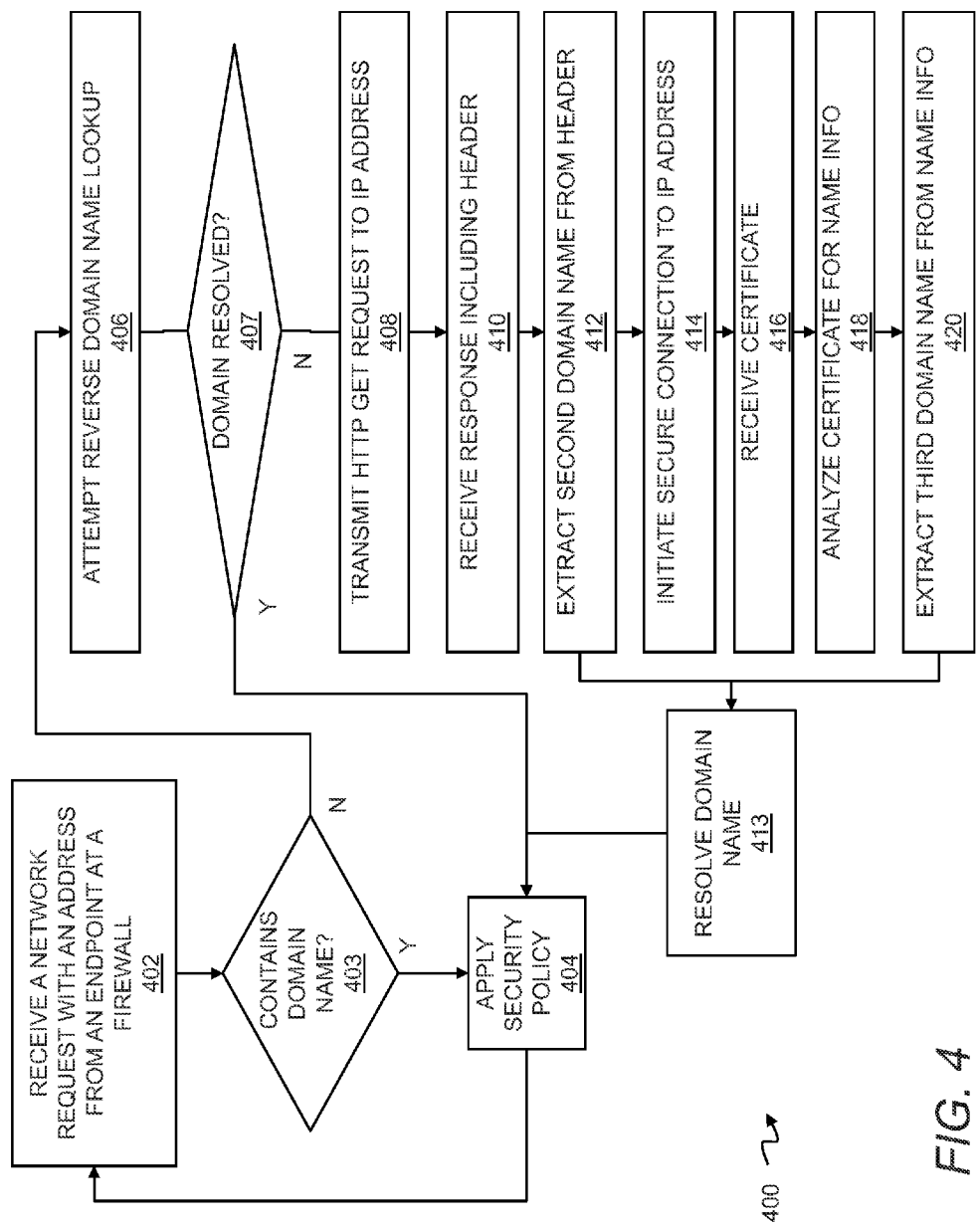
FIG. 4 is a flow chart of a method for deploying a security policy based on domain names.

FIG. 4 is a flow chart of a method for deploying a security policy based on domain names. The method 400 may be deployed on a firewall in any of the architectures, environments, or systems described herein. In general, the security policy to be enforced may include any number of rules or the like that are to be applied based on the domain name of the network request.

As shown in step 402, the method 400 may include receiving a network request from an endpoint at a firewall. The network request may include an address including a domain name or an IP address for accessing a remote resource such as a website, file server, or other network destination.

As shown in step 403, if the network request includes a domain name, the method 400 may proceed to step 404 and a security policy may be applied directly based on the domain name that is provided. A variety of security policies and rules are known in the art, any of which may be adapted for use in the firewall contemplated herein. This may, for example, include whitelisting of acceptable domain names, blacklisting of unacceptable domain names, and so forth, any of which may be based on an exact domain name or groups of domain names specified by, e.g., wildcards or the like. It will be appreciated that the firewall and security policy may also implement a variety of additional techniques for controlling network access by an endpoint, and those rules or policies that rely on a domain name may be usefully modified as contemplated herein to be similarly applied to network requests that contain an IP address rather than a domain name.

After the security policy is applied in step 404, the method 400 may return to step 402 where another network request can be received and processed by the firewall.

As shown in step 406, when the address in the network request includes an IP address, the method 400 may include attempting a reverse domain name lookup. This may include a query to a remote service or database such as a DNS server that stores IP-to-domain mappings that can be remotely queried. Of course, this may not immediately resolve the issue for a variety of reasons including those described above. Generally, the DNS system was not originally designed to handle reverse queries, and adapting DNS servers to provide reverse domain lookups may result in inconsistent or incomplete results, such as where the DNS server that receives the query is not the authoritative DNS server for the IP address of interest. The reverse domain name lookup may also or instead be directed to a local database or cache of IP-domain mappings that has been aggregated over a history of network interactions by the endpoint, the firewall, or any other suitable network element.

As shown in step 407, if the domain name is unambiguously resolved from the reverse domain name lookup, then the method 400 may proceed to step 404 where the security policy is applied. If the domain name is not ambiguously resolved by the reverse domain name lookup, then the method 400 may proceed to step 408 for additional processing.

As shown in step 408, when the address includes an IP address (and optionally, when a reverse domain name lookup fails to unambiguously identify a domain name), the method 400 may include transmitting an HTTP GET request from the firewall to the IP address. The HTTP GET request may be transmitted to a default HTTP port or to an alternate HTTP port.

As shown in step 410, the method 400 may include receiving a response to the HTTP GET.

In one aspect, the response may include a URL redirection containing a location header and a status code. The status code may, for example, include an HTTP status code of 301 indicating that the requested resource (or more precisely, the requested Uniform Resource Identifier (URI)) has moved temporarily or an HTTP status code of 302 indicating that the requested resource has moved permanently. The location header may in general be an absolute URL that fully resolves the new domain name, or the location header may be a relative URL that must be combined with the originally requested domain to provide a fully specified URL (e.g., including a scheme (http, https, telnet, mailto, etc.) and host (e.g., a web server address). In this latter case, the relative URL may not resolve to a domain name suitable for use with the security policy unless the balance of the fully specified URL can be obtained elsewhere. It will also be appreciated that a location header might also be provided in additional circumstances, such as when providing the location of a newly created resource (HTTP status code 201 or 202), and whether this provides useful domain name information will depend upon the nature of the particular response containing the location header.

In another aspect, the response to the HTTP GET The header may also or instead include a cookie that identifies one or more domain names, such as an HTTP Set-Cookie header. This header contains an explicit request to set a cookie in a browser that can be returned whenever the browser navigates to a website identified in the cookie. Where the website includes a domain name, a strong inference can be made that the IP address of the original request directs to that domain name.

As shown in step 412, the method 400 may include extracting a second domain name associated with the IP address from the header of the response to the HTTP GET request. For example, the location header or Set-Cookie header described above may contain domain name information specific to the host or domain responding from the targeted IP address, and this information may be used to infer the corresponding domain name. The domain name may be extracted from other information in the response based on the syntax of the response, or on the identification of structure of the domain name (e.g., labels separated by periods as in a conventional domain name space). This extracted domain name may be used to resolve the domain name as shown in step 413. It will be understood that the domain name may be extracted and used alone, or additional information about the source of the domain name may be forwarded where this is potentially useful for determining the significance of the extracted domain name information.

As shown in step 413, the domain name may be resolved based on the second domain. It will be understood that the domain name used with the security policy may more generally be resolved based on any suitable combination of the first domain (from the reverse domain name lookup), the second domain (from the HTTP request), and the third domain (from the SSL handshake). These various techniques for resolving the domain name may be optionally applied—that is, tried in sequence until a satisfactory or consistent result is obtained—or unconditionally applied so that each technique is performed in order, and then the aggregated results are used to select a domain for application of the security policy, or some combination of these may be used. For example, the results may be analyzed at each step to determine a level of confidence in the estimated domain name, and once the level of confidence reaches a predetermined level, for example if the reverse domain name lookup and the HTTP response contain a single, identical domain, then the method 400 may proceed to step 404 to apply a security policy. In another aspect, all of the techniques may be applied to gather at least three different results, and then these aggregated results may be used to determine the domain. In another aspect, if the three techniques fail to identify an unambiguous domain name, then this conclusion may be used to apply a suitable, corresponding security policy (e.g., preventing all traffic to IP addresses that cannot be reliably resolved to a domain name).

More generally, a variety of techniques including rules, heuristics, quantitative scoring, machine learning, and the like may be employed to select a domain name for use in applying a security policy.

As shown in step 414, the method 400 may include initiating a secure connection from the firewall to the IP address. The secure connection may include a Secure Sockets Layer (SSL) connection. For example, in one aspect, the secure connection is initiated through a default port for HTTP over Transport Layer Security/Secure Socket Layer (TLS/SSL) (collectively, HTTPS). Alternatively, the secure connection may be initiated through an alternate port for HTTP over TLS/SSL.

As shown in step 416, the method 400 may include receiving a certificate at the firewall from a server responding at the IP address, such as a web server or other service or resource.

As shown in step 418, the method 400 may include analyzing the certificate for name information. In particular, the syntax of an SSL response specifies a Common Name and a Subject Alternative Name for a domain, along with an identification of the owner of the domain, so that this information can be used to verify the identity of the host, for example with reference to a trusted third party such as VeriSign, DigiCert, or some other certificate authority.

As shown in step 420, the method 400 may include extracting a third domain name associated with the IP address from the name information. This information may be extracted directly from the certificate, where the Common Name and Subject Alternative Name specify domain names associated with the owner of the certificate (and presumably, the host at the IP address that provided the certificate). It should be noted that a certificate may be used with more than one fully qualified domain name, with the multiple hosts names specified in the Subject Alternative Names of the certificate. Thus additional information may be required to unambiguously select a domain name with this information. But if a single domain name is supplied, then a very confident inference can be made that the host at that IP address corresponds to that domain name.

As shown in step 413, the method 400 may proceed to step 413 where one or more of the first domain name (from a reverse domain name lookup), the second domain name (from a response to an HTTP GET request), and the third domain name (from an SSL handshake) may be used to resolve a domain name for use with a security policy enforced at the firewall. The method 400 may then proceed to step 404 where the security policy is applied.

In an aspect, a computer program product comprising computer executable code embodied in a non-transitory computer-readable medium executes on the firewall, and deploys a security policy for an enterprise by performing any or all of the steps discussed above.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for deploying a security policy based on domain names comprising:
   receiving a network request from an endpoint at a firewall, the network request including an address for a remote resource;
   when the address includes a domain name, applying the security policy to the network request based upon the domain name; and
   when the address includes an Internet Protocol (IP) address, performing the steps of:
      transmitting a hypertext transfer protocol (HTTP) GET request from the firewall to the IP address;
      receiving a response including a header;
      extracting a second domain name associated with the IP address from the header; and
      applying the security policy to the network request based upon the second domain name.

2. The method of claim 1 further comprising:
   initiating a secure connection from the firewall to the IP address;
   receiving a certificate at the firewall from a server responding at the IP address;
   analyzing the certificate for name information; and
   extracting a third domain name associated with the IP address from the name information.

3. The method of claim 2 wherein the secure connection is a Secure Sockets Layer (SSL) connection.

4. The method of claim 2 wherein the secure connection is initiated through a default port for HTTP over Transport Layer Security/Secure Socket Layer (TLS/SSL).

5. The method of claim 2 wherein the secure connection is initiated through an alternate port for HTTP over TLS/SSL.

6. The method of claim 2 wherein the name information includes at least one of a Common Name or a Subject Alternative Name of a domain that the server is hosting.

7. The method of claim 2 wherein the second domain name and the third domain name are different, the method further comprising selecting one of the second domain name and the third domain name to apply the security policy.

8. The method of claim 1 wherein the header of the response to the HTTP GET request includes a location header containing the second domain name.

9. The method of claim 8 wherein the second domain name is a redirection address.

10. The method of claim 9 wherein the header includes an HTTP status code of 301 identifying the redirection address as a temporary redirection address.

11. The method of claim 9 wherein the header includes an HTTP status code of 302 identifying the redirection address as a permanent redirection address.

12. The method of claim 1 wherein the header includes a cookie identifying the second domain name.

13. The method of claim 1 further comprising, when the address includes the IP address, attempting a reverse domain name lookup.

14. The method of claim 1 wherein the HTTP GET is transmitted to a default HTTP port.

15. The method of claim 1 wherein the HTTP GET is transmitted to an alternate HTTP port.

16. The method of claim 1 wherein the security policy includes a whitelist of acceptable domain names.

17. The method of claim 1 wherein the security policy includes a blacklist of unacceptable domain names.

18. The method of claim 1 wherein, when the address includes an Internet Protocol (IP) address, the method further includes:
   attempting a reverse domain name lookup;
   when the reverse domain name lookup adequately resolves the domain name, applying the security policy based on the domain name; and
   when the reverse domain name lookup up fails to adequately resolve the domain name, proceeding with the HTTP GET request to the IP address.

19. A computer program product comprising computer executable code embodied in a non-transitory computer-readable medium that, when executing on a firewall, deploys a security policy for an enterprise by performing the steps of:
   receiving a network request from an endpoint at a firewall, the network request including an address for a remote resource;
   when the address includes a domain name, applying the security policy to the network request based upon the domain name; and
   when the address includes an Internet Protocol (IP) address, performing the steps of:
      transmitting a hypertext transfer protocol (HTTP) GET request from the firewall to the IP address;
      receiving a response including a header;
      extracting a second domain name associated with the IP address from the header; and
      applying the security policy to the network request based upon the second domain name.

20. The computer program product of claim 19 further comprising code that performs the steps of:
   initiating a secure connection from the firewall to the IP address;
   receiving a certificate at the firewall from a server hosting a source of the IP address;
   analyzing the certificate for name information; and
   extracting a third domain name associated with the IP address from the name information.

21. A firewall comprising:
   a first network interface coupled to an endpoint;
   a second network interface coupled to a remote resource;
   a memory containing computer code;
   a processor configured to respond to a network request including an address from the endpoint received at the first network interface by performing the steps of: when the address includes a domain name, applying a security policy to the network request based upon the domain name; and when the address includes an Internet Protocol (IP) address, performing the steps of: attempting a reverse domain name lookup and extracting a first domain name associated with the IP address from the reverse domain name lookup, transmitting a hypertext transfer protocol (HTTP) GET request from the firewall to the IP address, receiving a response including a header, extracting a second domain name associated with the IP address from the header, initiating a secure connection from the firewall to the IP address, receiving a certificate at the firewall from a server hosting a source of the IP address, analyzing the certificate for name information, extracting a third domain name associated with the IP address from the name information; and applying the security policy to the network request based upon at least one of the first domain name, the second domain name, and the third domain name.

* * * * *